April 9, 1968

L. PEROLD 3,376,697

AGRICULTURAL IMPLEMENTS

Filed Feb. 2, 1965

Inventor
LOUIS PEROLD
BY
Tweedale & Gerhardt
Attorneys.

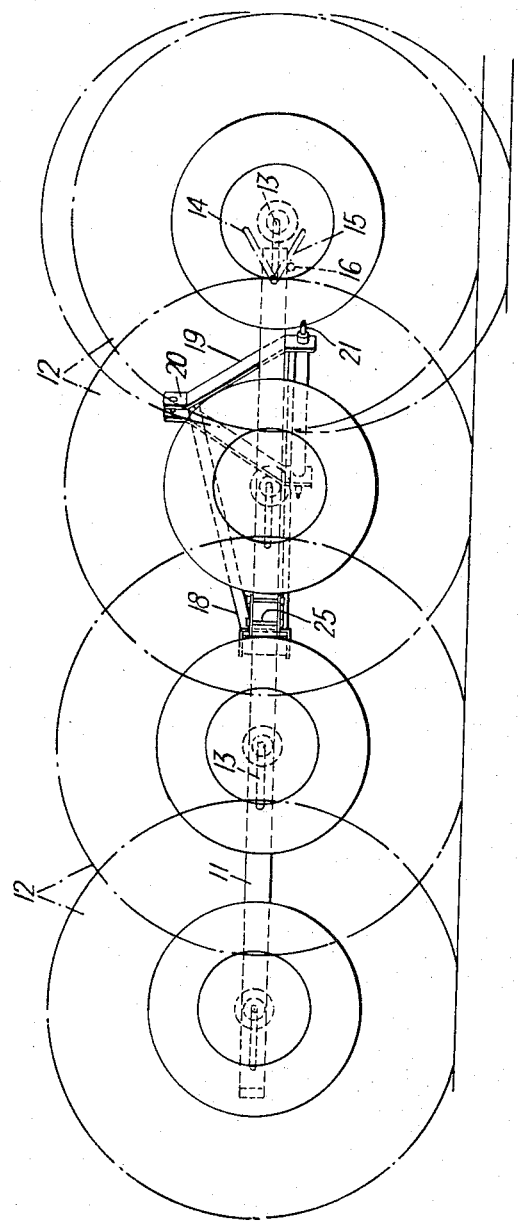

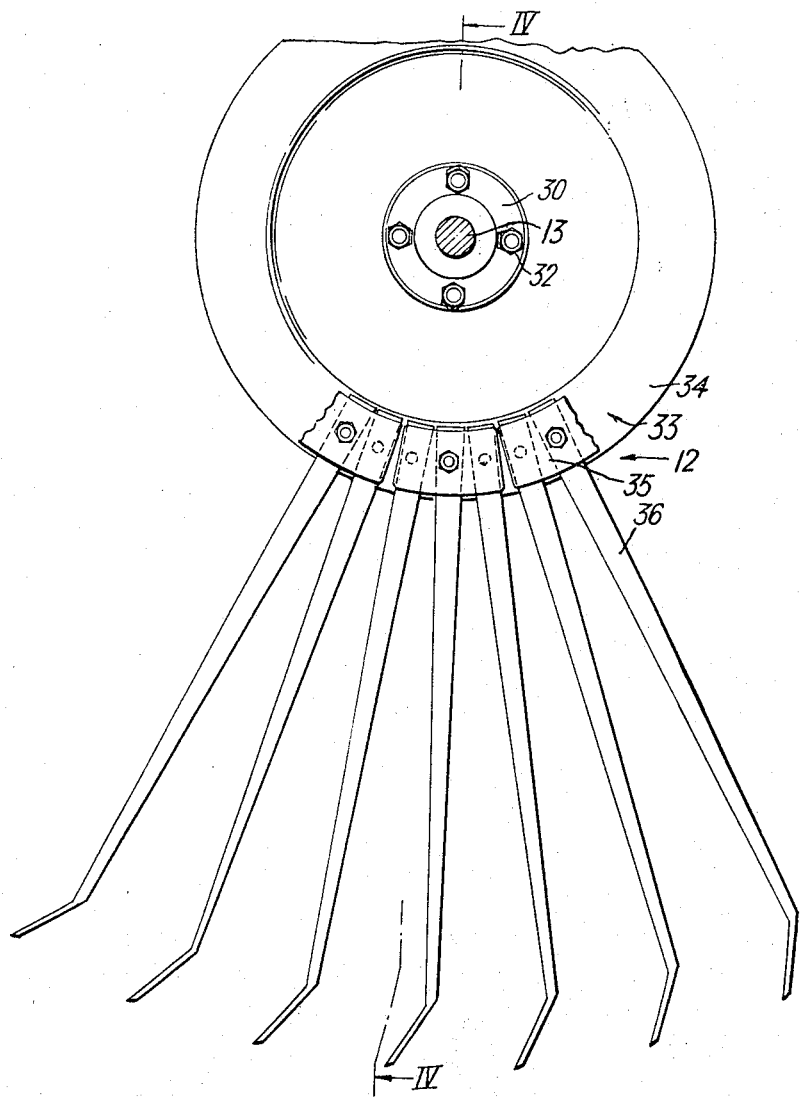

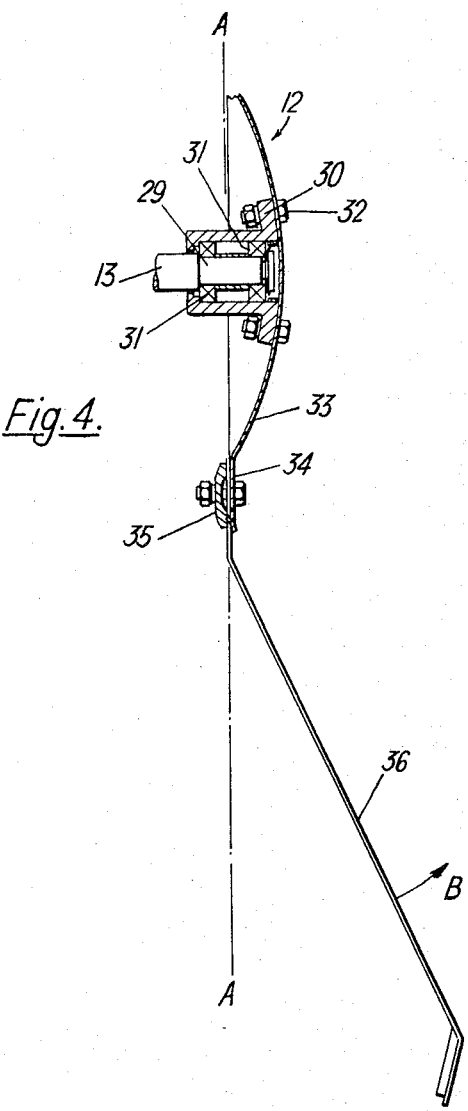

United States Patent Office 3,376,697
Patented Apr. 9, 1968

3,376,697
AGRICULTURAL IMPLEMENTS
Louis Perold, Three Rivers, Vereeniging, Transvaal, Republic of South Africa, assignors to South African Farm Implement Manufacturers Ltd., Peacehaven, Vereeniging, Transvaal, Republic of South Africa
Filed Feb. 2, 1965, Ser. No. 429,732
Claims priority, application Great Britain, Feb. 12, 1964, 5,808/64
1 Claim. (Cl. 56—400)

ABSTRACT OF THE DISCLOSURE

A rake wheel of the type having rake fingers or tines projecting radially from a central hub, and which is rotated by engagement of the tines with the gound. The tines are in the form of flat strips of resilient steel clamped at their inner ends in the plane of rotation of the rake wheel such that the cross section of the tines offers a high resistance to bending in the plane of rotation and a low resistance to bending normal to the plane of rotation.

---

This invention relates to rake wheels of the type having a number of rake fingers or tines (referred to hereinafter and in the claims as "tines") radiating from a central hub the tines being adapted to be rotated by engagement with the ground. Such rake wheels are referred to hereinafter as "rake wheels of the type aforesaid."

It is desirable that the tines of rake wheels of the type aforesaid satisfy two conflicting requirements. They must be resiliently flexible to accommodate variations in ground contour and yet they must be sufficiently strong to remain in driving engagement with the ground.

The invention is a rake wheel of the type aforesaid in which the tines are formed of resilient material and are of rectangular cross-section.

Alternatively the tines may be of substantially elliptical or semi-elliptical cross-section having a major axis which is large relative to the minor axis.

By constructing the tines of rectangular, elliptical or semi-elliptical cross-section they are stiff in the plane of the minor axis and resiliently deformable at right angles thereto.

Preferably each tine is in the form of a substantially flat spring strip or blade, the longitudinal axis of the cross-section of which is parallel to the general plane of rotation of the wheel.

Accordingly the invention is also a rake wheel of the type aforesaid in which the tines are stiff in the general plane of rotation of the wheel and resiliently deformable at right angles thereto.

Preferably also each tine is tapered from the hub outwards.

In addition a portion of each tine is preferably inclined to the general plane of rotation of the wheel. This inclination is such that when in use the greater portion of each tine is inclined rearwardly in the direction of travel.

The invention is also a tine for a rake wheel, the tine being formed of resilient material and having a rectangular, elliptical or semi-elliptical cross-section.

An embodiment of the invention will now be described, simply by way of example with reference to the accompanying drawings in which:

FIG. 2 is a corresponding elevation;

FIG. 3 is a diagrammatic fragmentary view of part of a rake wheel; and

FIG. 4 is a section on the line IV—IV of FIG. 3 showing, in addition, details of the wheel mounting.

Figure 1:
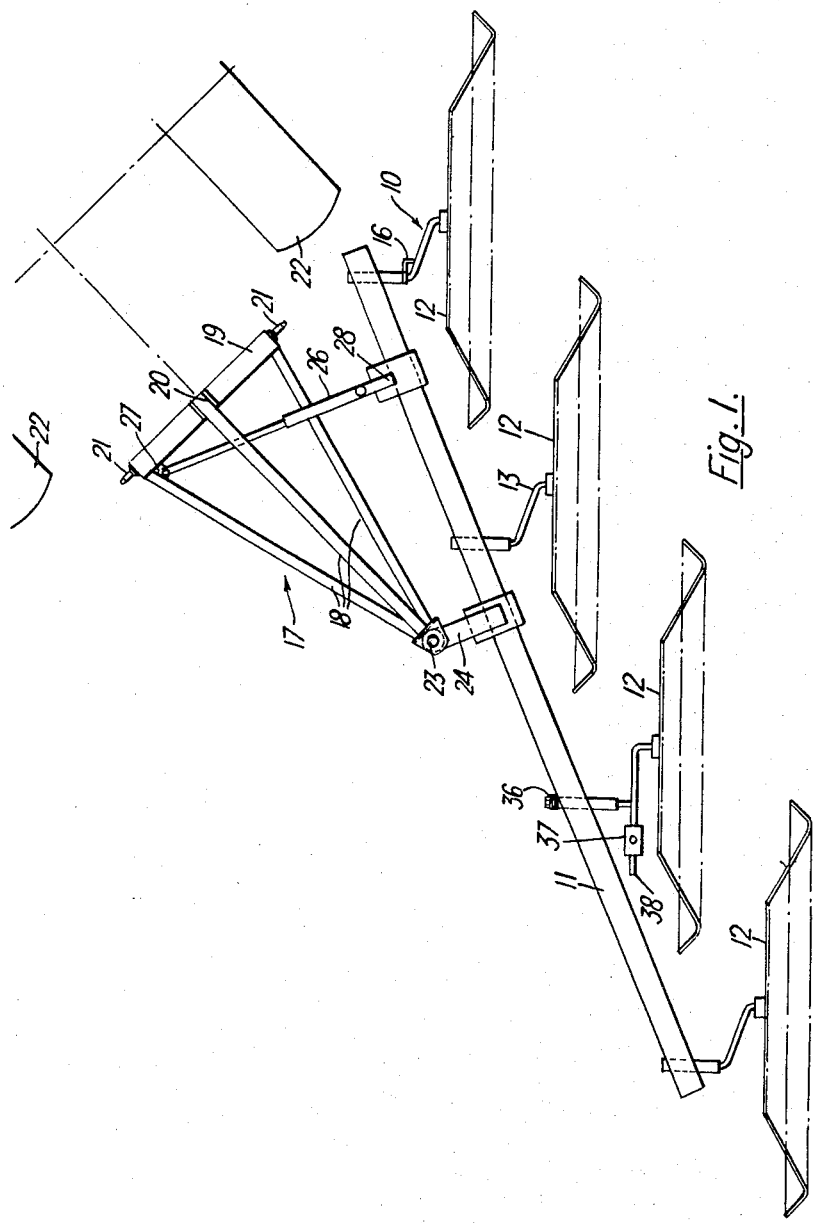
FIG. 1 is a diagrammatic plan view of a rake assembly mounted on a tractor.

Referring to the drawings, FIG. 1 shows a rake assembly 10 for raking agricultural crop material and consisting of a main frame in the form of a beam 11 carrying four rake wheels 12. The rake wheels are carried on cranks 13 which may pivot vertically between upper and lower positions indicated at 14 and 15 in FIG. 2 so that each wheel may float independently of the others to ensure that when at work each rake wheel follows the ground contour independently of the others. A stop 16 limits the lower position of each crank to allow the rake assembly to be raised from a working to a transport position in which the wheels are clear of the ground.

The main frame 11 is carried by a sub-frame 17 having bracing members 18 connected to triangularly disposed points on an A-frame 19. The A-frame is provided with an upper bracket 20 and spaced lower pins 21 adapted for connection to the upper and lower links respectively of a 3-point hitch linkage (not shown) mounted on a tractor, the rear wheels of which are shown at 22.

The three bracing members 18 are pivotally interconnected at 23 and are connected to the main frame 11 by a tie member 24 rigidly clamped by bolts 25 to the frame 11. A link 26 is pivotally connected at one end to a bracket 27 on the A-frame 19 and at the other end to a further tie member 28 clamped to the frame 11 in a manner similar to the tie member 24. The link 26 is telescopic and its length may be selectively adjusted to alter the angular position of the main frame 11 relative to the sub-frame 17.

Referring now to FIGS. 3 and 4, each rake wheel 12 is rotatably mounted on an end portion 29 of the crank 13 by means of a hub 30 mounted on bearings 31 on the end portion 29. The hub has secured to it by bolts 32 a spring steel cover 33 of dome shape. The cover 33 has a flattened rim 34 between which and a series of clamps 35 are secured the inner ends of a plurality of tines 36. In the example each clamp 45 holds three tines in position. The tines 36 extend radially from the rim 34 and are inclined to the general plane of rotation A—A of the wheel. The outer or ground-engaging tips of the tines are angled forwardly with respect to the direction of travel so as to prevent material being raked from being carried round with the wheel. The forward angling of the tips ensures that the material is thrown clear of the wheel.

It should be noted that the greater portion of each tine is angled rearwardly with respect to the direction of travel. This means that as the rake assembly is drawn over the ground the tines in engagement with the ground tend to bend in the direction of the arrow B in FIG. 4, this bending being permitted by the special construction of the tines now to be described.

Each tine is in the form of a rectangular section blade or strip of spring steel one end of which is secured between the rim 34 and clamp 35 so that the flat face of the blade faces at substantially right angles to the direction of rotation of the blade, that is the longitudinal axis of the cross-section of the blade is parallel to the general plane of rotation of the wheel. Thus since the inner end of the blade is anchored, the action of the ground on the free end forces the blade to bend in the direction of the arrow B in FIG. 4, the spring strip construction resiliently opposing such movement to retain the free end in contact with the ground. Moreover the construction is such that very large forces would be required to bend the tine in the direction of rotation.

Thus the rectangular blade or strip construction of the tines provides adequate flexibility in the desired direction, that is substantially normal to the general plane of rotation of the wheel without making the wheel as a whole unduly flexible and weak or liable to deformation. The only deformation which occurs takes the form of an effective reduction in the radial distance of the outer ends of the tines from the wheel axis. As a result of this construction no rim or other reinforcement need be provided to retain the tines in place.

In addition, each tine is tapered from its inner to its outer end. This achieves greater flexibility at the ground-engaging (outer) end without increasing stress at the inner end.

In the embodiment the length of the cross-section of each tine varies from 1 inch at the inner end of the tine to ¼-inch at the tip, and the width of the cross-section is ⅛-inch throughout.

If desired friction discs 36 (FIG. 1) may be provided to dampen the wheels and cranks. Also a counterweight 37 may be slidably mounted on an extension 38 of each crank 13 to alter the pressure applied to the ground by the associated wheel.

Although for the purpose of explaining the invention a specific embodiment thereof has been described in detail it is to be understood that variations and modifications within the ambit of the invention may readily occur to those skilled in the art and the invention is not to be limited to the specific example shown and described.

For example, though in the embodiment the tines are of rectangular cross-section, adequate flexibility in a direction normal to the general plane of rotation of the wheel would be attained by using tines of substantially elliptical or semi-elliptical cross-section having a small minor axis and a relatively large major axis.

I claim:
1. A rake wheel comprising a hub, a cover secured to the hub and having a flattened rim lying in the plane of rotation of the cover about the axis of rotation of the hub, a plurality of tines each of which is in the form of a flat strip of resilient material tapered from its flat inner end to its outer end, and means rigidly clamping the flat inner ends of the tines snugly to said rim around the periphery thereof such that the tines project radially of the axis of the hub, and the longitudinal axis of the cross section of the tines is parallel to said plane of rotation to provide high resistance to resilient deformation in the plane of rotation and low resistance to resilient deformation at right angles to the plane of rotation and wherein the tines are inclined with respect to said plane of rotation from said rim to the outer ends of the tines.

References Cited
UNITED STATES PATENTS

| | | | |
|---|---|---|---|
| 2,670,588 | 3/1954 | Plant | 56—377 |
| 3,010,526 | 11/1961 | Van der Lily | 56—377 X |
| 3,150,721 | 9/1964 | Van der Lily | 56—377 X |
| 3,176,457 | 4/1965 | Van der Lily | 56—377 |
| 3,057,145 | 10/1962 | Van der Lily | 56—377 |

ABRAHAM G. STONE, *Primary Examiner.*

P. A. RAZZANO, *Assistant Examiner.*